United States Patent
Fong et al.

(10) Patent No.: US 6,208,373 B1
(45) Date of Patent: Mar. 27, 2001

(54) METHOD AND APPARATUS FOR ENABLING A VIDEOCONFERENCING PARTICIPANT TO APPEAR FOCUSED ON CAMERA TO CORRESPONDING USERS

(76) Inventors: Timothy Lo Fong, 960 Kiely Blvd. #F, Santa Clara, CA (US) 95051; Reuven Acknen, 649 Chimalus Dr., Palo Alto, CA (US) 94306

( * ) Notice: Subject to any disclaimer, the term of this patent is extended or adjusted under 35 U.S.C. 154(b) by 0 days.

(21) Appl. No.: 09/366,436

(22) Filed: Aug. 2, 1999

(51) Int. Cl.[7] .................................................. H04N 7/14
(52) U.S. Cl. ............................. 348/14.16; 348/14.03; 348/14.07
(58) Field of Search .................. 348/14, 15, 16, 348/17, 18, 19, 20; 379/93.21, 93.17; 345/330, 332, 339, 340, 341

(56) References Cited

U.S. PATENT DOCUMENTS 5,359,362 * 10/1994 Lewis et al. ............................ 379/15

FOREIGN PATENT DOCUMENTS

404373386A * 12/1992 (JP) .................................. H04N/7/15
406351015A * 12/1994 (JP) .................................. H04N/7/15

* cited by examiner

*Primary Examiner*—Curtis Kuntz
*Assistant Examiner*—Melur Ramakrishnaiah
(74) *Attorney, Agent, or Firm*—Donald R. Boys; Central Coast Patent Agency

(57) ABSTRACT

A system for avoiding lost look in video conferencing utilizes multiple cameras outside a monitor screen at a conferencing station for capturing images of a participant and a processor system enabled to utilize video streams from the cameras and software including a field graph to create a stream presenting the participant as though the created stream were captured from a virtual video camera positioned within the monitor screen. In some embodiments the processor takes into account data pertaining to an active window to position the virtual camera in the active window. In other embodiments moveable cameras are employed with an audio system having directional input, which the processor can use to train cameras on a current active participant.

12 Claims, 4 Drawing Sheets

METHOD AND APPARATUS FOR ENABLING A VIDEOCONFERENCING PARTICIPANT TO APPEAR FOCUSED ON CAMERA TO CORRESPONDING USERS

FIELD OF THE INVENTION

The present invention is in the field of videoconferencing and related digital network applications and pertains more particularly to methods and apparatus for defining the apparent position of a participant in a video conference relative to camera apparatus.

BACKGROUND OF THE INVENTION

Communication over wide area networks (WANs) such as over the well-known Internet network has become more practical and useful as various technologies used in such as teleconferencing have been refined. For example, video teleconferencing has been markedly improved over the last few years. Improvements to video cameras, equipment, and videoconferencing software have allowed for cleaner and more fluid video motion, clearer audio, and sharper imaging. In many cases, improvements in video codec methods, data compression techniques, and bandwidth reservation schemes have been largely responsible for the improved quality. However, better hardware including cameras and the like have also lent to better quality.

In a typical videoconferencing session two or more users having a network-capable appliance such as a PC, a video camera and the appropriate software are connected to each other over a network such that each user may interact with a video/audio representation of all other users participating in a given session. Such users are typically represented in framed viewing widows that appear on participant's respective display monitors. Such monitors may be CRT monitors, flat panel displays, or other adapted viewer interfaces.

In a most basic application, a user may view and hear only another user to whom he has an open channel. To conference in a third party, a second channel must be opened and the first channel put on hold. In some enhanced applications, there may be several users taking part in one session. Any one of the several users may, if enabled by software and suitable hardware, view all the other participating users simultaneously in separate framed windows on his or her display during a session. A limit or capacity relating to the possible number of participating parties is generally imposed on any one active session. That number depends of the complexity level of software and hardware mix maintained on the network appliance used in the session.

A problem with prior art videoconferencing systems is that only one camera is typically provided and mounted in one position and directed to each participating user. Therefore, a user must be looking into the camera in order for a correspondent to see the user face-on. If a user's gaze is directed away from the camera, a somewhat awkward feeling can be experienced by correspondents that are conferencing with the user. This awkward feeling has to do with a state that you are talking with someone that is not meeting your gaze. In other words, a user appears on-screen to be lost or to have a lost look. This problem is routinely avoided in the television industry by prompting a person to look only at a camera that is on and actively recording. It is generally accepted that if he or she cannot do this and one camera catches them gazing into another camera, then the effectiveness of their presentation or message may be reduced.

While this problem relates to a somewhat instinctive human discomfort and may be rationalized away by practitioners of videoconferencing systems, it is nonetheless desired that improvements be made to correct the problem by providing a videoconferencing system wherein all participants appear focused and engaged (not looking off to the side).

The cause of the lost look effect is brought about by a user who instead of looking directly at a camera while talking, wants to see the person or persons he is talking to. He does this by moving his gaze from the camera to a framed window on his display containing a representation of one of the correspondents. If there is more than one window containing representations of correspondents, a user may switch his gaze from one to another while talking with them and not look at the camera at all. The resulting lost look can have a subtle affect on the seriousness of a user's message.

Some companies have attempted to reduce the problem by integrating the camera into a user's monitor or display screen. A camera placed in the center of the monitor, for example, may reduce the lateral distance from the camera to any framed windows. This can reduce the lost look effect but does not eliminate it. Moreover, if the monitor is very large and the corresponding windows are on the peripheral of such a monitor, the lost look effect may still be quite significant.

Another attempt to minimize the lost look effect has been offered by companies that provide a special screen much like a projection screen wherein a camera is mirrored into the screen. Light sensitivity is a drawback to this type of system requiring components to be held small and enclosed. Also, the screen is considerably larger than a standard PC monitor. Therefore, if the correspondent windows are on the peripheral of the screen, a lost look effect is still produced.

Other developers have attempted to use two cameras and stereo software to position a camera virtually within a display monitor screen. U.S. Pat. No. 5,886,735 was issued on such a system and is provided in an IDS filed in association with this patent application. There are still some problems even with this development.

What is clearly needed is a method and apparatus that will create a virtual camera effect that may be placed anywhere in a videoconference screen. Such a virtual camera may be trained to follow a user's angle of gaze into his screen when the user is not looking into an actual camera such that a face-on image stream representing the user may be created and transmitted to correspondents instead of an angled shot depicting a lost look.

SUMMARY OF THE INVENTION

In a preferred embodiment of the present invention a videoconferencing station is provided, comprising a display monitor having a display screen for displaying images of remote conferencing participants; two or more video cameras external to the display monitor for capturing images of one or more local participants positioned before the display monitor screen; and a computerized processing system coupled to both the display monitor and the video cameras for receiving video streams associated with video conferences and displaying images from the video streams, for sending a video stream to the remote conferencing participants, and for processing the images captured by the two or more video cameras. The processing system, by executing software including a field graph and using the captured images provided by the two or more video cameras, produces and sends a single video stream providing an image of a local participant as though the stream were captured from a virtual video camera positioned within the area of the display screen.

In one embodiment the processing system positions the virtual video camera at or near the center of the display screen. In other embodiments the processing system uses input as to active windows in the display screen to position the virtual video camera at a position associated with the active window.

In another embodiment the video conferencing station additionally comprises robotic operators associated with individual ones of the video cameras, two or more positions for local participants in front of the monitor screen, and an audio input system for the participants with directional capability, wherein the processing system causes the robotic operators to train individual ones of the video cameras on individual ones of the local participants according to directional input from the audio input system. The directional capability may entail each local participant having an individual microphone, wherein each individual microphone is associated with a position before the display screen for the local participant, or a stereo microphone, wherein the processing system is enabled to determine position of local participants before the display screen based on input from the stereo microphone.

In another aspect of the invention a video conferencing system is provided comprising two or more video conferencing stations; and a videocapable link between the two or more stations, wherein one or more of the stations is characterized by a display monitor having a display screen for displaying images of remote conferencing participants, two or more video cameras external to the display monitor for capturing images of one or more local participants positioned before the display monitor screen, and a computerized processing system coupled to both the display monitor and the video cameras for receiving video streams associated with video conferences and displaying images from the video streams, for sending a video stream to the remote conferencing participants, and for processing the images captured by the two or more video cameras, and wherein the processing system, by executing software including a field graph and using the captured images provided by the two or more video cameras, produces and sends a single video stream providing an image of a local participant as though the stream were captured from a virtual video camera positioned within the area of the display screen.

In some embodiments the processing system positions the virtual video camera at or near the center of the display screen. In others the processing system uses input as to active windows in the display screen to position the virtual video camera at a position associated with the active window. In other embodiments the video conferencing system additionally comprises robotic operators associated with individual ones of the video cameras, two or more positions for local participants in front of the monitor screen, and an audio input system for the participants with directional capability, wherein the processing system causes the robotic operators to train individual ones of the video cameras on individual ones of the local participants according to directional input from the audio input system. The directional capability in some cases comprises each local participant having an individual microphone, wherein each individual microphone is associated with a position before the display screen for the local participant. In other embodiments the directional capability comprises a stereo microphone, and the processing system is enabled to determine position of participants before the display screen based on input from the stereo microphone.

In another aspect of the invention a method for correcting a lost look in a video conferencing system is provided, comprising steps of (a) capturing images of a conferencing participant by two or more video cameras positioned outside a display screen; and (b) feeding a video stream from the two or more video cameras to a processor; and (c) creating a single video stream from the two or more streams and stored variables and constants, and using a field graph algorithm, the single video stream presenting the conferencing participant as though captured from a virtual camera placed within the monitor screen.

In one embodiment processor positions the virtual camera at or near the center of the monitor screen. In another the processing system uses input as to active windows in the display screen to position the virtual video camera at a position associated with the active window. There may be additionally a step for manipulating robotic operators associated with individual ones of the video cameras to focus on an individual participant positioned before the monitor screen by processing input from an audio input system with directional capability. The directional capability comprises in some embodiments each local participant having an individual microphone, wherein each individual microphone is associated with a position before the display screen for the local participant. In the directional capability comprises a stereo microphone, and the processing system is enabled to determine position of local participants before the display screen based on input from the stereo microphone.

In various embodiments of the invention described in enabling detail below, for the first time video conferencing systems are enabled to position a virtual camera within a screen area and to amend the position of the virtual camera according to shifts a participant may make in his or her direction of look.

BRIEF DESCRIPTION OF THE DRAWING FIGURES

DESCRIPTION OF THE PREFERRED EMBODIMENTS

Figure 1:
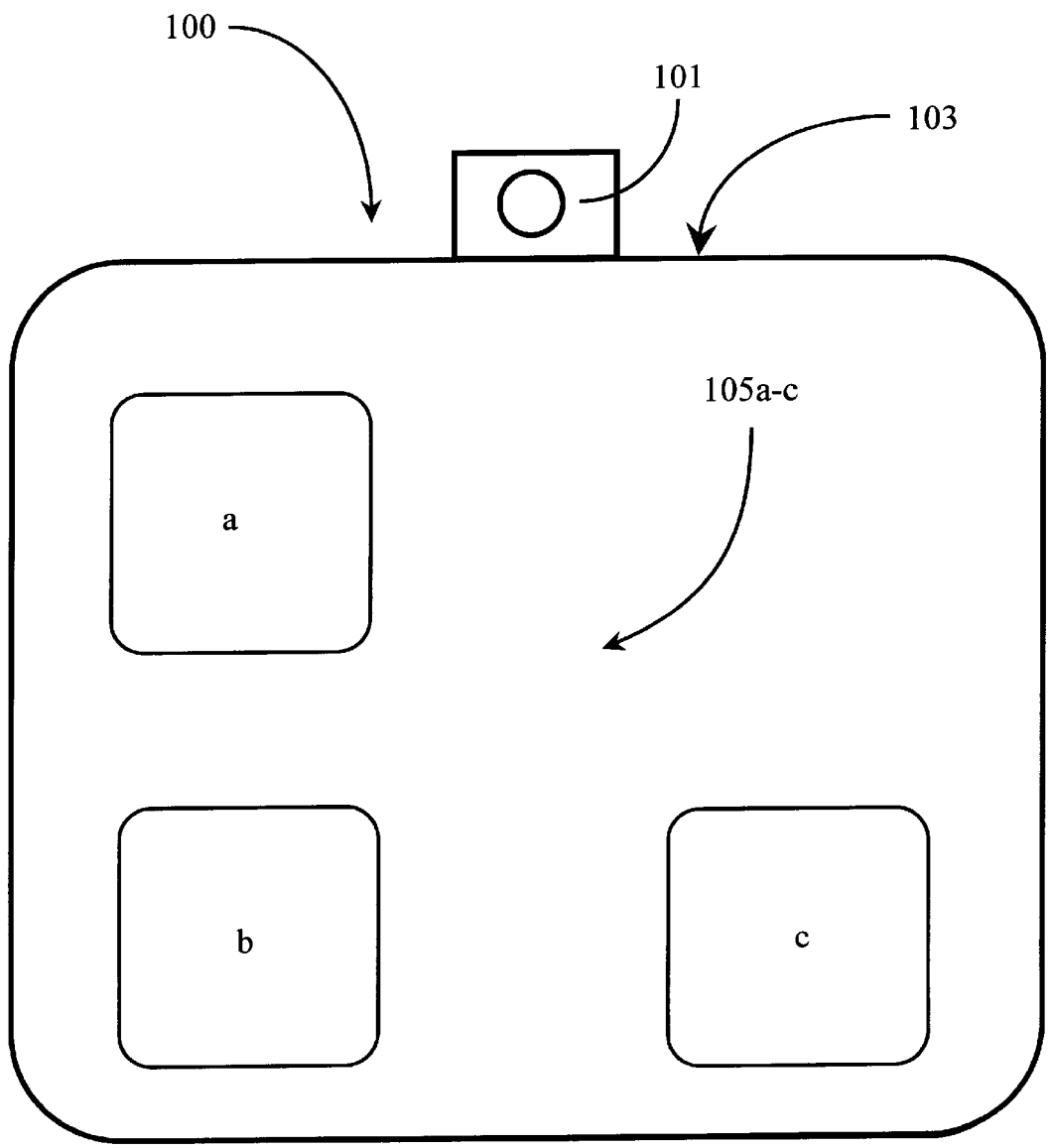
FIG. 1 is a block diagram illustrating a videoconferencing station according to prior art.

FIG. 1 is a block diagram illustrating a videoconferencing system 100 engaged in an active session according to prior art technology. System 100 has a display monitor 103, which may be a CRT monitor, a flat panel display, or any other standard display monitor adapted for videoconferencing. In this prior art example, monitor 103 is a CRT monitor such as is typically associated with a personal computer. However, monitor 103 may instead be associated with a videophone, a WEB TV, or any other known appliance capable of network videoconferencing.

A camera 101 is provided in a typical externally-mounted fashion exhibited with most prior art video-conferencing systems. Camera 101 is shown in this example as being mounted to the top-center area of monitor 103. In some more recent prior art implementations, camera 101 may be provided as an integrated unit inside screen 103.

During a videoconferencing session one or more content windows may appear on screen 103. In this session content windows 105a–c are illustrated as appearing in screen 103 and are associated with the current videoconferencing session. For example, at least one of windows 105a–c will contain a video/audio representation of a correspondent (session participant). Other windows may contain other participating correspondents (if more than two are participating), script or text dialog boxes, or other informative displays associated with a particular video conference session.

It can be appreciated that in order to obtain a face-on image of a user conferencing on screen 103, it is required that such a user look directly into camera 101. If a user instead looks at content in one of windows 105a–c, then any other user participating in this session from a remote system will see the first participant in other than a face-on view. This anomaly produces the lost look effect described in the background session.

If camera 101 were integrated with screen 103 such that it is held in a fixed position inside screen 103, perhaps centered, then the lost look effect may be reduced but may not be, in all cases, eliminated.

The inventor solves the problem illustrated in this prior art example by providing multiple cameras and a software application that creates a virtual camera adapted to shoot from anywhere in screen 103, and that may adjust the virtual camera position as needed. The method and apparatus of the present invention will be further explained below.

Figure 2:
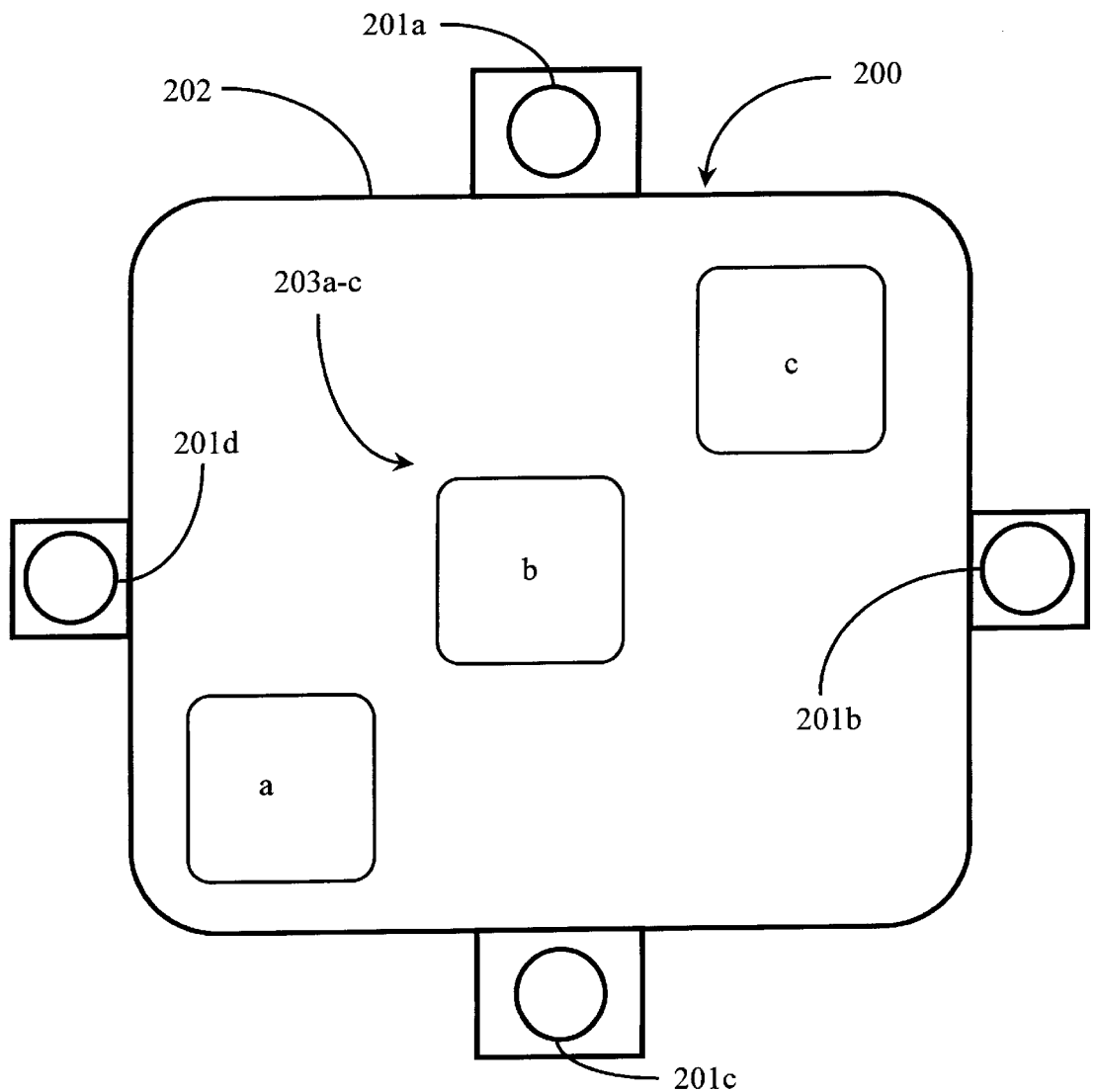
FIG. 2 is a block diagram illustrating a videoconferencing station according to an embodiment of the present invention.

FIG. 2 is a block diagram illustrating a videoconferencing system 200 engaged in an active session according to an embodiment of the present invention. Monitor 202 is, in this embodiment, a CRT monitor typical of such as a personal computer adapted to practice the present invention as was described with monitor 103 of FIG. 1. However monitor 202 may be a display generic to any type of network appliance that may be adapted for videoconferencing such as a video phone or perhaps a WEB TV screen.

Instead of utilizing a single camera such as camera 101 of the prior art system 100 (FIG. 1), the inventor provides a plurality of cameras 201a–d, which are mounted around the periphery of screen 202. Cameras 201a–d may be mounted in positions other than the ones shown in this example without departing from the spirit and scope of the present invention. Furthermore, there may be fewer or more cameras 203a–d provided than the four illustrated herein as long as there are at least two such cameras. More cameras may provide advantages in virtual placement in embodiments of the present invention. In one embodiment, there may be only 2 cameras such as, perhaps, 201d and 201b mounted across from each other. In a more preferred embodiment, there are at least three cameras provided such as, perhaps, cameras 201a, 201b and 201d. The preference for more than 3 cameras 201 is born of a fact that more cameras can provided more input data to system 200 as will be further explained below.

The specific mounting pattern of cameras 201a–d is not particularly critical to the practice of the present invention as long as they are distributed generally around screen 202. Each camera 201a–d is adapted to focus on a user from each mounted positions such that there are multiple camera angles in line-of-sight recording.

There are 3 video presentation windows 203a–c illustrated as presented on screen 202. Windows 203a–c are analogous to windows 105a–c of prior art system 100 (FIG. 1). For example, all three windows 203a–d may present images of correspondents practicing the present invention and engaged in conferencing with a user operating system 200. In one embodiment window 201a may have an image of a correspondent, while window 203b contains a script and window 203c is another type of text dialog such as chat or messaging system. There are many possibilities.

A particular object of the present invention is to be able to create a virtual camera position in the screen area of the monitor by combining specific image data from cameras 201a–d. Such a virtual camera is not an actual camera, but a recreated image of a user resulting from a sequence of data results found by combining the real-time camera image inputs from cameras 201a–d. Other data comprising input and variable information such as the coordinate positions of windows 203a–c, which of windows 203a–c is currently active in the session, and like information, is also incorporated into a calculation sequence for the virtual camera.

In practice of the present invention, a user engaged in a session using system 200 may be looking at window 203b, which for the purpose of the present invention, is assumed to be the current active window in the session. As previously described, window 203b may be an image window for a correspondent, or such as a script or text display. It will be appreciated that while a user is looking directly at window 203b, he is not looking at any one of cameras 201a–d. However, cameras 203a–d are trained on the user and recording separate and complete image sequences of the user from the respective angles and perspectives of their mounted positions around screen 202. Along with the known angles of shoot for each camera 203a–d, an accurate distance from each camera face to the face of the user is also known.

While a user is looking at window 203b, cameras 201a–d are recording and sending their separate streams into a processing means (not shown in FIG. 2) for capturing, analyzing, and then utilizing only the combined and calculated data required to produce a virtual image sequence of the user. The created image sequence appears to other correspondents as if one camera were positioned at the receiving point of the user's gaze, in this case, from about a center point of window 203b, and that camera recording a face-on sequence.

Note that in this embodiment the position of the virtual camera is adjusted to the approximate center of the active window. If another window is made active, the coordinates of that window are known, and the virtual camera position can be shifted to the new active window. Advantage is taken of the high probability that a user will be looking at any window that is currently active, and that is a user intentionally activates a window, there is a high probability the user will be looking directly at the newly activated window.

In this way, a virtual camera effect is created and the resulting video stream transmitted to other correspondents makes it appear to them as if a mobile camera is always facing the user even as his gaze moves from one area of screen 202 to another. As a result, system 200 eliminates the lost look effect experienced with most prior art systems. More detail about the combining and calculation of separate data inputs to produce such a virtual camera is provided below.

Figure 3:
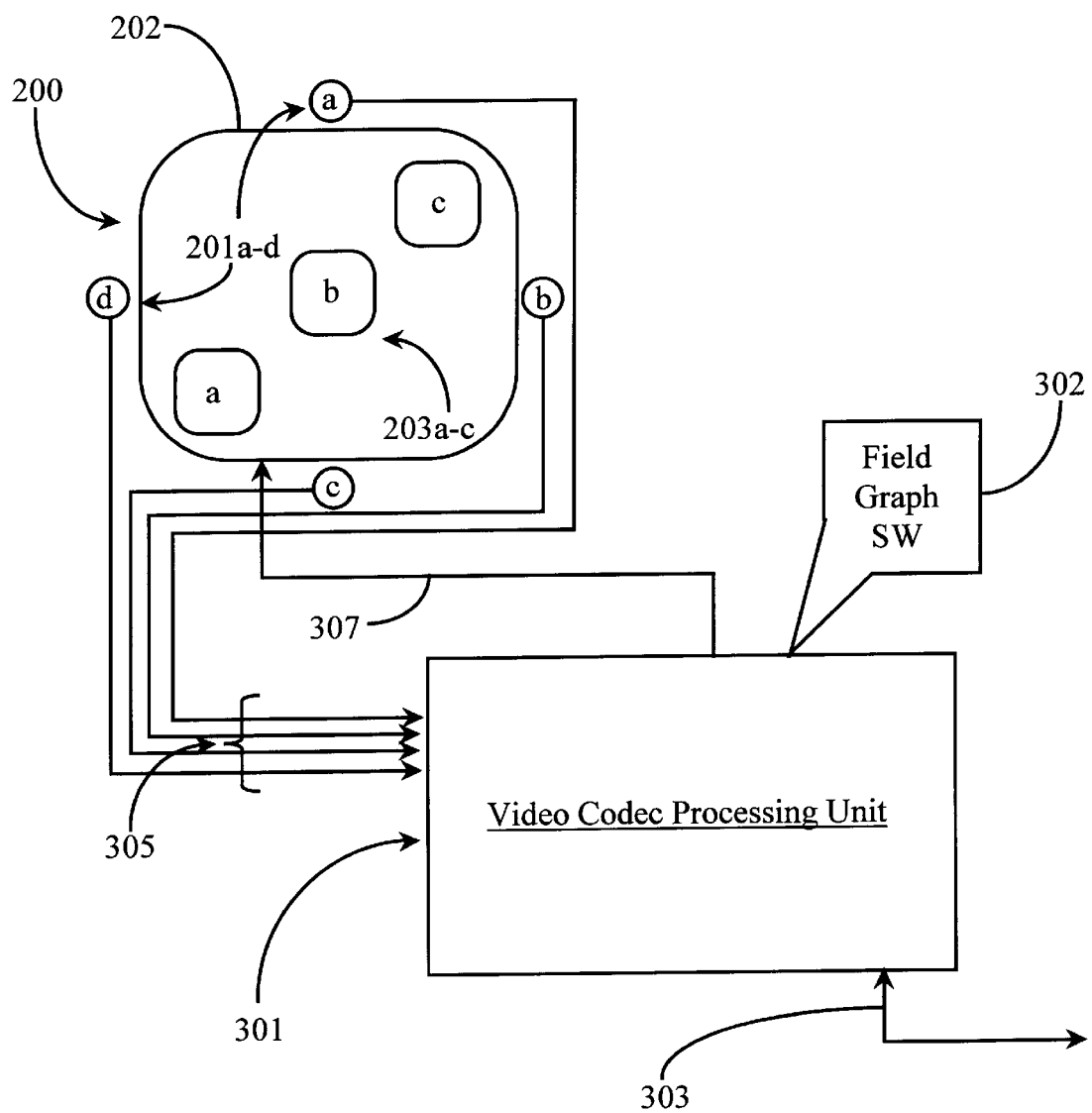
FIG. 3 is a block diagram illustrating the videoconferencing station of FIG. 2 interacting with a Video-codec processor according to an embodiment of the present invention.

FIG. 3 is a block diagram illustrating videoconferencing system 200 engaged in an active session and interacting with a Video-codec processing unit 301 enhanced with software 302 according to an embodiment of the present invention. System 200 uses a processing unit 301, which is a system for video-codec processing. Processing unit 301 may be any adapted processing hardware capable of using software to process and buffer digital video data.

Processor 301 may be a computer processor system, an enhanced videophone unit, or any other connected processor having suitable processing power for processing video/audio streams according to the invention. In this embodiment processor 301 is a computer processor running such as Windows™ and containing all of the necessary components known in the art and required for video/audio processing. Such components include but are not limited to a video capture device, a video device driver, sufficient random access memory (RAM), sound/video card, and so on.

Processing unit 301 receives separate video-data streams from each of cameras 203a–d as illustrated by connected directional lines 305 emanating from cameras 203a–d and proceeding into unit 301. A bi-directional network connection illustrated by element number 303 is provided and adapted to facilitate a communications network connection for system 200 as is known in the art. In this embodiment, connection 303 is presumed to be an Internet connection, which may be a land-line connection through an ISP, or a wireless fixed or mobile connection. In one embodiment, connection 303 may be to a local area network (LAN) that is further connected to a wide area network (WAN) or Internet connection.

In general, connection 303 represents any bi-directional communication link that may be established between nodes operating on a communications network and practicing the present invention. A video output channel 307 is provided and adapted to carry incoming video data from unit 301 to display on screen 202 as illustrated by the direction of the arrow on connection 307. Connection 307 conventional and determined in large part by the architecture of the computer hardware. In other embodiments, such as that of a videophone, all of the mentioned components comprising system 200 may be contained in one physical unit.

In addition to the normal video processing components provided to system 200 and adapted for the purpose of sending and receiving video/audio over a connecting network, the inventor provides an enhanced field graph software application (SW) 302 that may be integrated with the normal video/audio processing software provided to processing unit 301.

SW 302 contains routines required to combine data received from cameras 201a–d over lines 305 including other known data input and to perform calculations to obtain virtual data in order to produce the above described virtual image stream. Once processed in unit 301, the resulting image stream is transmitted by virtue of connection 303 and over a suitable network.

Field graphs are well known in the art of holographic imaging. They are used to calculate a particular view of an object in a virtual 3D space. The use of a field graph is generally based on holographic recording, or sometimes based on the use of stereo cameras. Typically, a field graph is used to calculate an interference pattern associated with an image. The calculated interference pattern presents the holographic image from a particular viewpoint.

SW 302 is, in this embodiment, an enhanced field graph application not known in prior art. A difference from a prior art application of a field graph application and field graph SW 302 of the present invention is that only a virtual image is calculated based on a desired virtual position and direction of a virtual camera resulting from data supplied by a plurality of actual cameras such as cameras 201a–d. Modern CPU's such as the Intel Pentium II™ and the AMD K6™ TM have a set of built-in accelerator functions to aid in such field graph calculations.

In general practice of the present invention a user operating system 200 engages in a conference call with at least one other remote user. When content windows such as windows 203a–c appear on screen 202 during a session, a user may be prone to looking directly at any one of the windows for any period of time. If all three windows 202a–c contain received video streams representing engaged correspondents, then a user may be prone to look at whichever window is active or engaged in a current transaction.

Assuming now that a user operating system 200 is interacting with a correspondent represented in window 203a, it is highly likely that the user will be looking at window 203a during the interaction. Interaction includes talking to, or listening to the represented correspondent in window 203a. Window 203a is known to the computer to be the active window. During this period of time representing a sequence, cameras 201a–d record separate video streams of the user during interaction. Each stream proceeds from each camera 201a–d over respective connections 305 to unit 301 for processing.

In this example, the coordinate position of window 203a on screen 202 is known. Window 203a may, in some embodiments, be determined to be active by a user clicking on the window. The coordinates of window 203a are then incorporated into calculation performed by SW 302. SW 302 creates an image as though taken from a virtual position based on the supplied data from cameras 201a–d. The coordinate data associated with window 203a is used in conjunction with all of or the closest of image coordinate data assignments taken from cameras 201a–d.

In this example, data from cameras such as cameras 201d and 201c, which represent the closest face-on renditions of the user may be all the data that is required for calculating an acceptable face-on virtual image. For example, camera 201d will show the user looking off to the right and angularly down while camera 201c will show the user looking off to the left and angularly up in terms of facial position. The remaining cameras are farther remote in terms of distance from window 201a, which is the window receiving the user's current attention. Therefore only cameras 201a and 201c may be tapped for useful data. If window 201b were the active window (receiving a user's gaze), then data from cameras 201a–d would be useful.

SW 302 has the capability of modeling a new image stream from the input streams and variable and constant data, the new stream containing new pixel values created from the actual pixel data of the two separate image steams taken from cameras 201d and 201c (most acceptable shots). The modeled or virtual stream is transmitted to all other corespondents over connection 303. The effect is that a user appears to have been recorded at a frontal face-on position as if a camera were positioned right behind window 203a.

In another embodiment the software also takes into account the cursor position on the screen to determine a virtual position for a video camera. In yet another embodiment, activation of any one window in order to obtain the likely coordinates attracting a user's gaze is not specifically required in order to practice the present invention. In this embodiment, SW 302 is enhanced with the capability of recognizing the tilt direction and angle of a user's face along an x-y-z axis by comparing an actual camera view of a user's face with a pre-entered face-on view of the user's face, thus enabling SW 302 to predict the directional angle of the user's gaze at any given moment.

Combined readings from such as all four cameras 201a–d will provide an accurate set of coordinates for any area on screen 202 that receives a user's gaze. In this way, a user is not limited to looking at a stated active window or object on screen 202. He may vary the direction of his or her gaze over screen 202 at will. A user may even look at portions of the screen or work area that are not specifically associated with system 200 such as a tool bar area, a side bar area, or even an area not associated with screen 202 such as a keyboard area. SW 302, with sufficient processing power, can calculate a real time virtual image stream that represents a face-on rendition of the user.

It will be apparent to one with skill in the art that the method and apparatus of the present invention may be used with externally mounted cameras such as cameras 201a–d described above, or with cameras which are integrated into the display screen or monitor without departing from the spirit and scope of the present invention.

In another embodiment of the present invention, it is desired that a system such as system 200 be adapted to work when more than one user is sharing a single display screen. The inventor provides an enhancement that uses directional indicators of input audio to pinpoint positions of more than one user sharing a display in order to enable mounted cameras to train on the appropriate user during videoconferencing activity. Such an enhanced embodiment of the present invention is detailed below.

Figure 4:
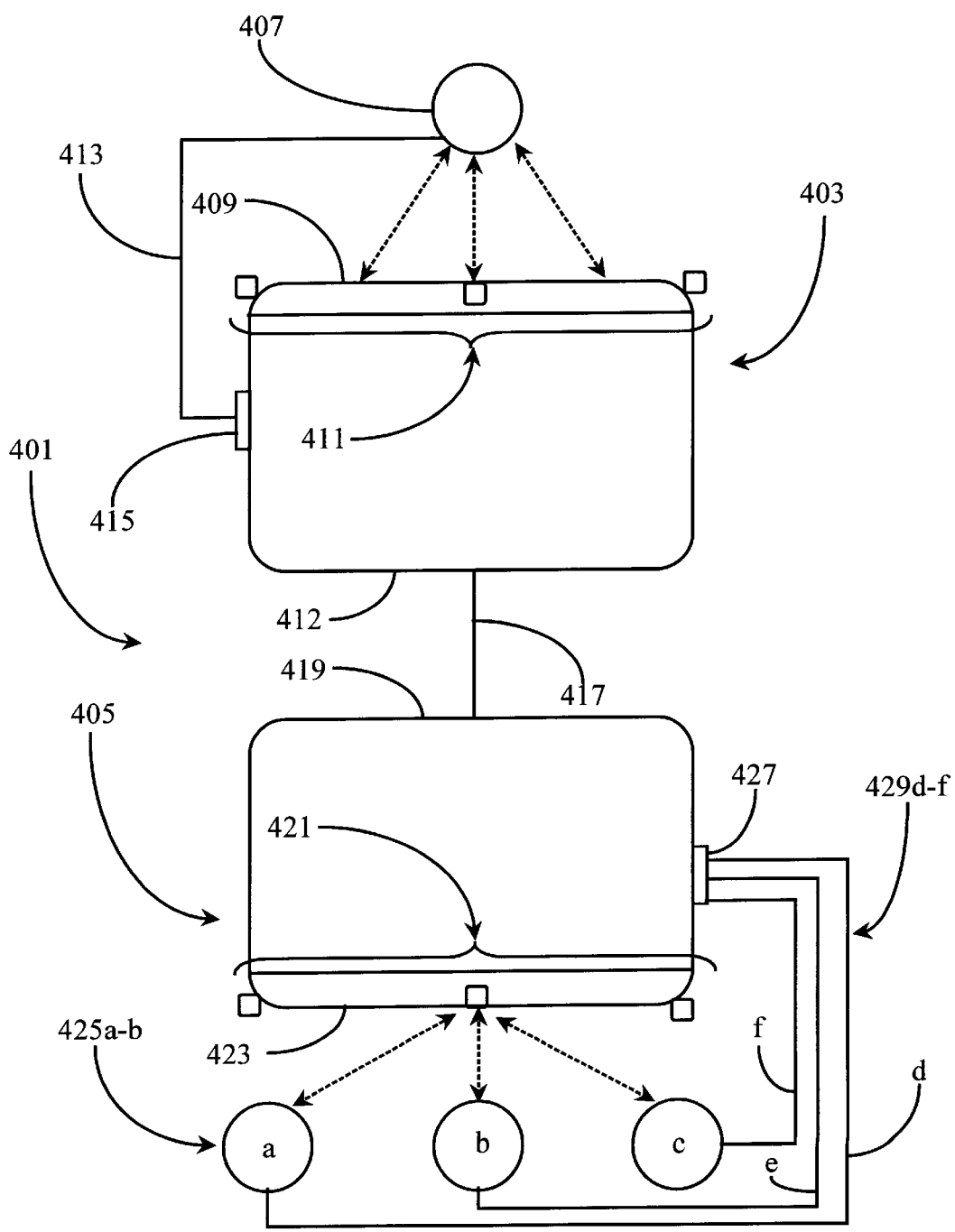
FIG. 4 is a block diagram illustrating a videoconferencing system wherein multiple users are enabled to share one videoconferencing screen according to an embodiment of the present invention.

FIG. 4 is a block diagram illustrating a videoconferencing system 401 wherein multiple users share one display screen according to an embodiment of the present invention. System 401 is provided and illustrated in this example as a system analogous to system 200 described above accept that it allows user sharing of a same display screen. System 401 comprises a user premise 403 and a user premise 405. Premises 403 and 405 represent remote equipment groupings connected to each other by a communications network 417 thus providing a working video conference connection using system 401. Premises 403 and 405 may be assumed to be identically adapted to support multiple users in a shared sense. However this is not specifically required as long as one premise supports multiple users.

Premise 403 comprises a user 407 in this embodiment operating a station with a display monitor 409. Display monitor 409 may be a modified (enlarged) CRT monitor screen connected to a personal computer illustrated herein by element number 412. In one embodiment, display monitor 409 may be a front or rear projection screen, or another type of screen associated with a network appliance capable of practicing the present invention. The fact that only one user 407 is illustrated as operating at premise 403 does not construe a limitation to the present invention. As described above, multiple users may operate at premise 403 in a shared sense, however for the purpose of discussion, only one user 407 is illustrated at premise 403.

A plurality of externally mounted cameras 411 are provided and adapted to visually record user 407 during a video conferencing session. Cameras 411 are analogous to cameras 201a–d of FIG. 3 accept that in one embodiment they are robotically adjustable with respect to position as opposed to being fixedly mounted and manually adjustable. Three cameras 411 are visible in mounted positions around monitor 409. There may be more than three mounted cameras 411, or there may be as few as two cameras 411 provided as described in FIG. 2 with reference to cameras 201a–d.

In this example, user 407 employs a standard microphone (actual microphone not illustrated) to facilitate audio function during a videoconference session as is generally known in the art. A microphone line 413 illustrates the above-described implementation and active connection to computer 412 through a microphone port or jack 415. Microphone port 415 may be adapted to handle several microphones simultaneously by virtue of having a plurality of microphone sockets installed therein.

Premise 405 comprises a plurality of users 425a–b sharing operation of a display screen 423. All of the above parameters and options discussed with screen 409 are applicable to screen 423 of premise 405. A plurality of externally mounted cameras 421 is provided and positioned around screen 423. Cameras 423 are analogous to cameras 411 described above. Users 425 employ standard microphones in order to facilitate audio functions in video teleconferencing as is known in the art. The reason for employing more than one microphone at premise 405 is described below.

The microphone capability of user 425a is illustrated by a microphone line d leading into a microphone port or jack 427. Microphone lines e and f illustrate the microphone capabilities of users 425b and 425c respectively (actual microphones not detailed). All microphone lines d–f are illustrated as plugged into a single port 427, which contains a plurality of microphone sockets. Port 427 may be adapted to facilitate more or fewer microphone connections without departing from the spirit and scope of the present invention.

In a simple embodiment, all connected microphones are given a unique port address by virtue of identifying each available entry socket into port 427. In the case of users 425a–c, each maintains a separate microphone with a unique address that may be used to identify the seating arrangement taken by users 425a–c in front of screen 423 when video-conferencing.

In one embodiment he robotic adjustability of cameras 421 and 411 is linked by software to the addressing method of connected microphone lines. For example, when one of users 425a–b is designated to talk into his or her microphone, that particular user is deemed active causing cameras 421 to adjust their positions accordingly. In this way whenever one of users 425a–b is actively speaking into his microphone, cameras 421 automatically pan to that particular user. When another of users 425a–c takes over, cameras 421 pan accordingly. This requires, of course, that each user speak in turn independently of the other users when videoconferencing if all cameras are to train on that user.

In practicing the present invention according to the embodiment described herein, it is noted that user 407 is engaged in a videoconferencing session with users 425a–c. The situation may be that of an interview or the sort wherein user 407 is an interviewer and users 425a–c are subjects of an interview. Interviewer 407 may have three content windows (not shown) displayed on screen 409 with each window adapted to display a virtual image stream of it's assigned correspondent 425.

Because there is only one interviewer 407, cameras 411 are not required to pan, rather they are simply trained on user 407. If user 407 switches to a microphone assigned to another seat then he must also move to that seat, as cameras 411 will pan to that position when he begins speaking. Once interviewer 407 pauses for a response from one of subjects 425a–c, the appropriate content window on screen 409 at premise 403 begins display of the virtual image response. An indicator may be transmitted ahead of an expected response so that cameras may pan into position before the beginning of the response.

In one embodiment, certain ones of cameras 421 may be designated to pan if activated by microphone while others may be assigned fixed positions. There are many possible combinations. The virtual image capability of system 401 is, other than the audio/camera command enhancement described above, identical to that of system 200 described in FIGS. 2 and 3. Special group conferencing systems may be created having many microphones and robotic cameras.

Assume now that there are three content windows displayed on screen 409, which depict respective image streams of users 425a–c. In this case, user 407 has three typical gaze directions illustrated by dotted arrows. When any one of users 425a–c is designated to speak, a virtual camera effect transpires when cameras 421 train on that user. The resulting image stream appears as a face-on image stream to user 407 while the remaining two users exhibit a lost look effect. This is because all of cameras 421 pan to the active user. In another embodiment, specific cameras may have divided assignments. In the instance described above, users 425a–c will all be looking into one content window depicting the image stream of user 407 as represented by dotted arrows. As users 425a–c take turns speaking, the virtual camera capability at premise 409 acts to insure that the virtual image stream in the content window representing user 407 on screen 423 is always face-on even though user 407 switches his gaze among the content windows on screen 409 representing users 425a–c.

If additional windows appear, such as a script box, or other test display, any user may activate the window and change the virtual camera effect such that it appears that a camera is directly behind the now-active text window. In this way, virtual image streams remain engaged and focused in a face-on representation.

In another embodiment, multiple microphones with singular addresses are not required in order to practice the present invention. For example, instead of using microphone connections d–f, a single or stereo microphone implementation may be provided whereby one or more directional audio sensors capable of sensing direction and distance are integrate with the microphone. In this way, cameras 421 pan to a new user when he begins speaking and the sensors detect his location. The only drawback in this embodiment is that a user may have to utter an acknowledgement of some kind before beginning a response in order to give cameras 421 enough time to pan into position.

It will be apparent to one with skill in the art that the virtual image conferencing system of the present invention may be provided as a new system or it may be integrated with existing conferencing systems without departing from the spirit and scope of the present invention. For example, a software/hardware upgrade package may be provided and dedicated to enhancement of specific existing systems for the purpose of enabling practice of the present invention. Such an upgrade product would, of course, be tailored to the type of system including platform and supporting hardware that is targeted for upgrade.

According to a further embodiment, a 3-D system may be provided by including suitable 3-D graphics software and hardware with the system. In such as system, a virtual image stream may be made to appear as a 3 dimensional representation of a corresponding user. For example, if one user is seated off to the side and at an angle from a content window representing a correspondent, then the virtual image may be enabled to track the movements of the user such that it appears to be tilting and shifting it's gaze to look directly at the user. Such a complex embodiment would require considerable processing power and may not be practical for everyday users. However, such an embodiment is possible.

The method and apparatus of the present invention should be afforded the broadest scope in light of the many possible embodiments detailed above including other applicable embodiments envisioned by the inventor but not mentioned herein. Therefore, the spirit and scope of the present invention should be limited only by the claims that follow.

What is claimed is:

1. A video-conferencing station comprising:

a display monitor having a display screen for displaying images of remote conferencing participants;

two or more video cameras external to the display monitor for capturing images of one or more local participants positioned before the display monitor screen; and a computerized processing system coupled to both the display monitor and the video cameras for receiving video streams associated with video conferences and displaying images from the video streams, for sending a video stream to the remote conferencing participants, and for processing the images captured by the two or more video cameras;

wherein the processing system, using input as to active windows in the display screen, by executing software including a field graph and using the captured images provided by the two or more video cameras, produces and sends a single video stream providing an image of a local participant as though the stream were captured from a virtual video camera positioned within the area of an active window in the display screen.

2. The video conferencing station of claim 1 additionally comprising robotic operators associated with individual ones of the video cameras, two or more positions for local participants in front of the monitor screen, and an audio input system for the participants with directional capability, wherein the processing system causes the robotic operators to train individual ones of the video cameras on individual ones of the local participants according to directional input from the audio input system.

3. The video conferencing station of claim 2 wherein the directional capability comprises each local participant having an individual microphone, wherein each individual microphone is associated with a position before the display screen for the local participant.

4. The video conferencing station of claim 2 wherein the directional capability comprises a stereo microphone, and the processing system is enabled to determine position of local participants before the display screen based on input from the stereo microphone.

5. A video conferencing system comprising:

two or more video conferencing stations; and a video-capable link between the two or more stations; wherein one or more of the stations is characterized by a display monitor having a display screen for displaying images of remote conferencing participants, two or more video cameras external to the display monitor for capturing images of one or more local participants positioned before the display monitor screen, and a computerized processing system coupled to both the display monitor and the video cameras for receiving video streams associated with video conferences and displaying images from the video streams, for sending a video stream to the remote conferencing participants, and for processing the images captured by the two or more video cameras, and wherein the processing system, using input as to active windows in the display screen, by executing software including a field graph and using the captured images provided by the two or more video cameras, produces and sends a single video stream providing an image of a local participant as though the stream were captured from a virtual video camera positioned within the area of an active window in the display screen.

6. The video conferencing system of claim 5 additionally comprising robotic operators associated with individual ones of the video cameras, two or more positions for local participants in front of the monitor screen, and an audio input system for the participants with directional capability, wherein the processing system causes the robotic operators to train individual ones of the video cameras on individual ones of the local participants according to directional input from the audio input system.

7. The video conferencing system of claim 6 wherein the directional capability comprises each local participant having an individual microphone, wherein each individual microphone is associated with a position before the display screen for the local participant.

8. The video conferencing system of claim 6 wherein the directional capability comprises a stereo microphone, and the processing system is enabled to determine position of local participants before the display screen based on input from the stereo microphone.

9. A method for correcting a lost look in a video conferencing system, comprising steps of:

(a) capturing images of a conferencing participant by two or more video cameras positioned outside a display screen; and (b) feeding a video stream from the two or more video cameras to a processor, the processor using input as to active windows in the display screen; and (c) creating a single video stream from the two or more streams and stored variables and constants, and using a field graph algorithm, the single video stream presenting the conferencing participant as though captured from a virtual camera placed within an active window in the monitor screen.

10. The method of claim 9 additionally comprising a step for manipulating robotic operators associated with individual ones of the video cameras to focus on an individual participant positioned before the monitor screen by processing input from an audio input system with directional capability.

11. The method of claim 10 wherein the directional capability comprises each local participant having an individual microphone, wherein each individual microphone is associated with a position before the display screen for the local participant.

12. The method of claim 10 wherein the directional capability comprises a stereo microphone, and the processing system is enabled to determine position of local participants before the display screen based on input from the stereo microphone.

* * * * *